United States Patent [19]

Shin

[11] Patent Number: 5,319,458
[45] Date of Patent: Jun. 7, 1994

[54] METHOD AND CIRCUIT FOR GENERATING AN ADAPTIVE CONSTANT FOR BAND COMPRESSION OF VIDEO SIGNALS

[75] Inventor: Hyun-Soo Shin, Seoul, Rep. of Korea

[73] Assignee: Samsung Electronics Co., Ltd., Kyungki, Rep. of Korea

[21] Appl. No.: 992,824

[22] Filed: Dec. 16, 1992

[30] Foreign Application Priority Data

Dec. 16, 1991 [KR] Rep. of Korea ............... 23058/1991

[51] Int. Cl.$^5$ .................. H04N 5/21; H04N 5/20; H04N 7/12
[52] U.S. Cl. .................................................. 348/384
[58] Field of Search ............... 358/141, 133, 167, 166, 358/37, 36, 433, 135, 136, 174; H04N 7/04, 7/12, 7/13, 7/14, 5/20, 5/52, 5/21

[56] References Cited

U.S. PATENT DOCUMENTS

| | | | |
|---|---|---|---|
| 4,813,056 | 3/1989 | Fedele | 375/27 |
| 4,845,560 | 7/1989 | Kondo et al. | 358/135 |
| 4,873,230 | 10/1990 | Murakami et al. | 358/136 |
| 4,953,019 | 8/1990 | Skikakura et al. | 358/135 |
| 4,953,023 | 8/1990 | Kondo | 358/135 |
| 4,956,808 | 9/1990 | Aakre et al. | 364/900 |
| 4,959,843 | 9/1990 | Yon Park | 375/59 |
| 4,963,969 | 10/1990 | Kitaura et al. | 358/174 |
| 4,969,040 | 11/1990 | Gharavi | 358/136 |
| 4,970,594 | 11/1990 | Kitaura et al. | 358/174 |
| 4,979,038 | 12/1990 | Gulchard et al. | 358/135 |
| 4,982,292 | 1/1991 | Ito et al. | 358/426 |
| 5,040,060 | 8/1991 | Owada et al. | 358/135 |
| 5,210,609 | 5/1993 | Yu | 358/133 |
| 5,258,835 | 11/1993 | Kato | 358/135 |

FOREIGN PATENT DOCUMENTS 0121884 7/1983 Japan .................. 358/133

Primary Examiner—James J. Groody
Assistant Examiner—Chris Grant
Attorney, Agent, or Firm—Sughrue, Mion, Zinn, Macpeak & Seas

[57] ABSTRACT

A method and circuit for generating an adaptive constant of an adaptive modulator for the band compression of video signals. If a maximum amplitude value detected from picture elements in a block is greater than a first reference value, the number of picture elements having a lower amplitude value than a second reference value in the block is calculated. If the calculated number of picture elements is greater than a given number, the maximum amplitude value is divided by a given constant and an adaptive constant corresponding to the divided value is generated from an adaptive constant memory.

7 Claims, 3 Drawing Sheets

METHOD AND CIRCUIT FOR GENERATING AN ADAPTIVE CONSTANT FOR BAND COMPRESSION OF VIDEO SIGNALS

BACKGROUND OF THE INVENTION

The present invention relates to an adaptive modulating method for band compression of video signals, and more particularly to a method and circuit for generating an adaptive constant of an adaptive modulator capable of improving picture quality of the edges of video signals.

A typical adaptive modulator is employed for suppressing channel noise during data transmission when sub-band coding is used as a band compressing method of video signals in a high definition television (HDTV) system, etc. The adaptive modulation technique of this adaptive modulator is proposed for reducing the influence of the channel noise added when a sub-band coded video signal is transmitted in an MIT system such as the HDTV system of America. Moreover, Korean Patent Application No. 91-1023, filed Jan. 22, 1991, by the present inventor discloses a method and circuit for transmitting/receiving video signals using an adaptive modulation technique wherein an input band signal is divided into blocks having given sizes and a maximum value in the blocks is obtained. Next, an adaptive constant is obtained by using an adaptive constant table and the constant is directly multiplied by all the picture elements in the block. The multiplied values are then transmitted through a channel.

However, if there is a picture element A1 of a relatively high amplitude level and picture elements A2 to A6 of relatively low levels as shown in FIG. 1A, a conventional adaptive constant generating circuit does not sufficiently amplify the picture elements of the low level. Specifically, the conventional device will choose a multiplication constant based on all of the picture elements and the high level picture element will have too much of an influence over the choice of a multiplying constant because its amplitude is much higher than the others. As indicated in FIG. 1B, the noise immunity is not enhanced and the circuit is greatly influenced by the channel noise.

SUMMARY OF THE INVENTION

Therefore, it is an object of the present invention to provide a method and circuit for generating an adaptive constant capable of improving the picture quality of the edge of video signals.

It is another object of the present invention to provide a method and circuit for generating an adaptive constant capable of reducing the influence of channel noise for video signals.

According to the inventive method of the present invention, if a maximum value detected from picture elements in a block of digital video signals is greater than a first reference value, the number of picture elements less than a second reference value in the block is calculated. If this number of picture elements is greater than a given number, the detected maximum value is divided by a given constant, and an adaptive constant corresponding to the divided value is generated from an adaptive constant memory.

According to the inventive circuit of the present invention, the circuit for generating an adaptive constant includes a first means for detecting a maximum value of a block of digital video signals and comparing the maximum value with a first reference value, and a second means for calculating the number of picture elements less than a second reference value among the digital video signals and comparing the number of picture elements with a given number. A third means for selectively generating an adaptive constant based on either a value obtained by dividing the detected maximum value by a given constant or based on the maximum value, in response to comparative logic of the first and second means. The first means has a peak value detecting circuit and a comparator, and the second means includes a count circuit and a comparator. Further, the third means has an AND gate, a multiplexer, a demultiplexer, a divider and a delay. The output of the third means is supplied to an adaptive constant memory 15. Moreover, the adaptive constant memory generates an adaptive constant corresponding to the output of the third means and multiplies each picture element amplitude by the adaptive constant and supplies the results to a latch and supplies an adaptive constant index to another latch.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF THE PREFERRED EMBODIMENTS

In the preferred embodiment, by considering not only a maximum amplitude value in a block but also the level distribution of picture elements when an adaptive constant is obtained, the picture elements of a low level are sufficiently amplified, and thus, the channel noise can be suppressed.

Figure 2:
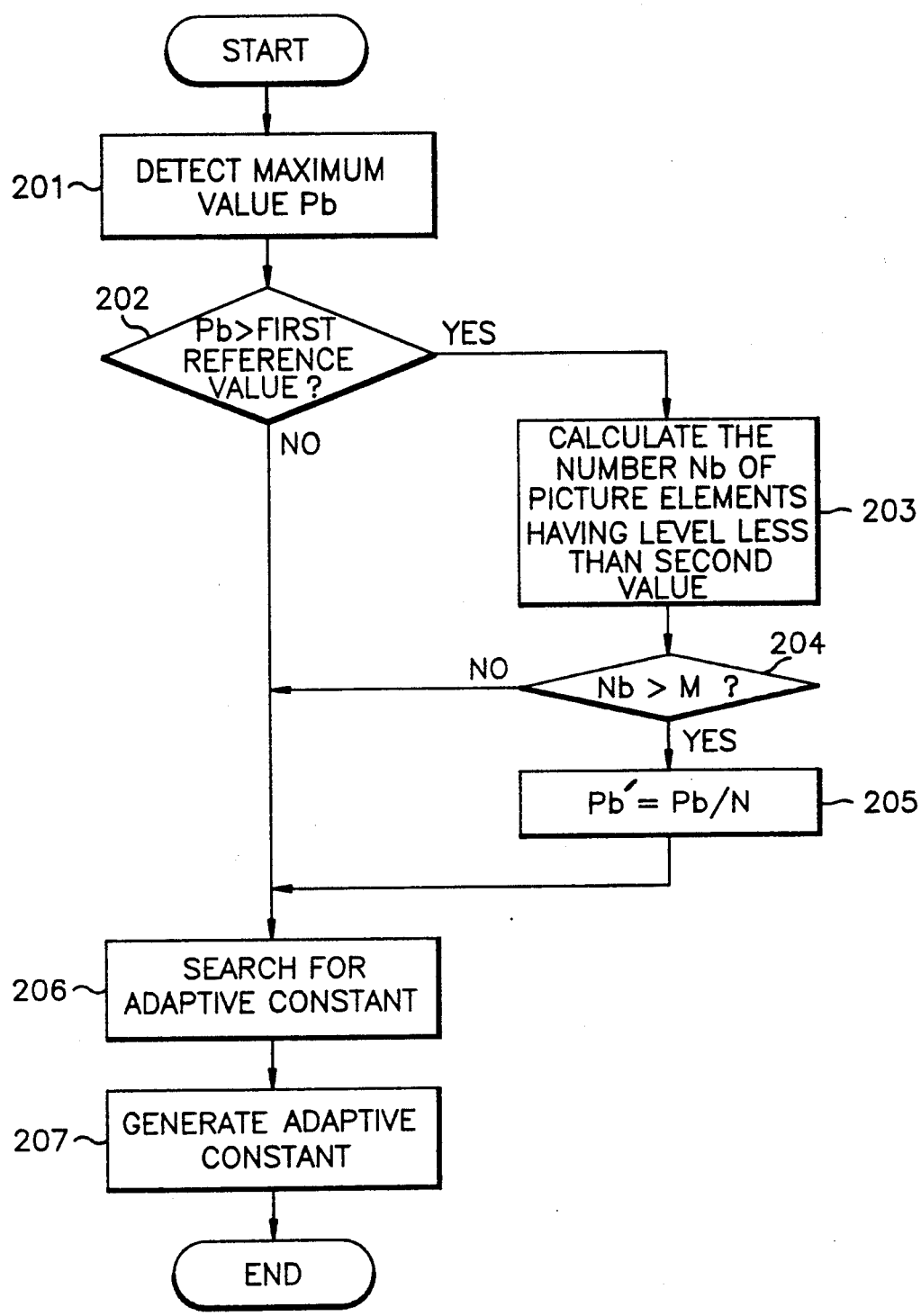
FIG. 2 is a flow chart illustrating the steps of generating an adaptive constant according to the present invention.

Referring now to FIG. 2, a maximum amplitude value Pb in a block of digital video signals is detected in step 201. In step 202, the maximum amplitude value Pb is checked to see if it is greater than a first reference value (for example, high frequency band: 31, low frequency band: 64). If the maximum amplitude value Pb is less than the first reference value, an adaptive constant is searched for using the maximum value Pb in step 206. Next, the adaptive constant is generated in step 207. If the maximum value Pb is greater than the first reference value, step 202 advances the step 203 to calculate the number Nb of picture elements having an amplitude level less than a second reference value (for example, low frequency band: 9, high frequency band: 6). In step 204, a check is made to see if the number Nb of picture elements is greater than a given number M (for example, in the case of a 4×3 block, 9). If the number Nb of picture elements is less than the given number M, step 204 is followed by step 206, and otherwise, step 204 is succeeded by step 205 to calculate a modified maximum value Pb' by dividing the maximum value Pb by a given number N. Therefore, the adaptive constant can be amplified.

Figure 1A:
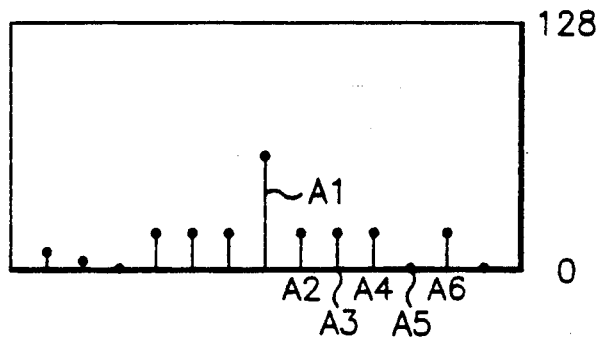
FIG. 1A is an exemplary diagram illustrating block data.
Figure 1B:
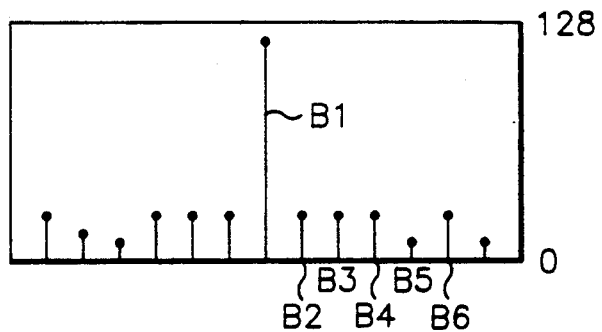
FIG. 1B illustrates block data converted by a conventional adaptive constant generating circuit, and FIG. 1C block data converted by the present invention.
Figure 1C:
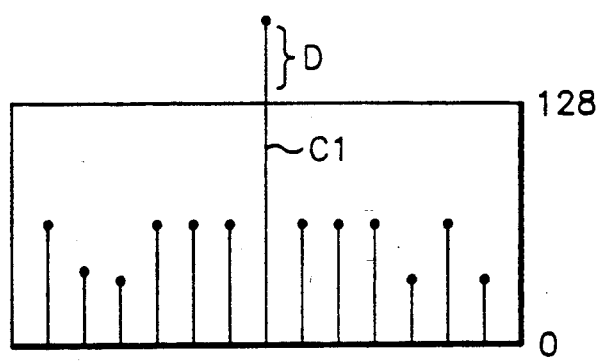

FIG. 1C illustrates block data when the present invention is applied. As shown, it will be readily understood that most of picture elements having a low level are sufficiently amplified.

Figure 3:
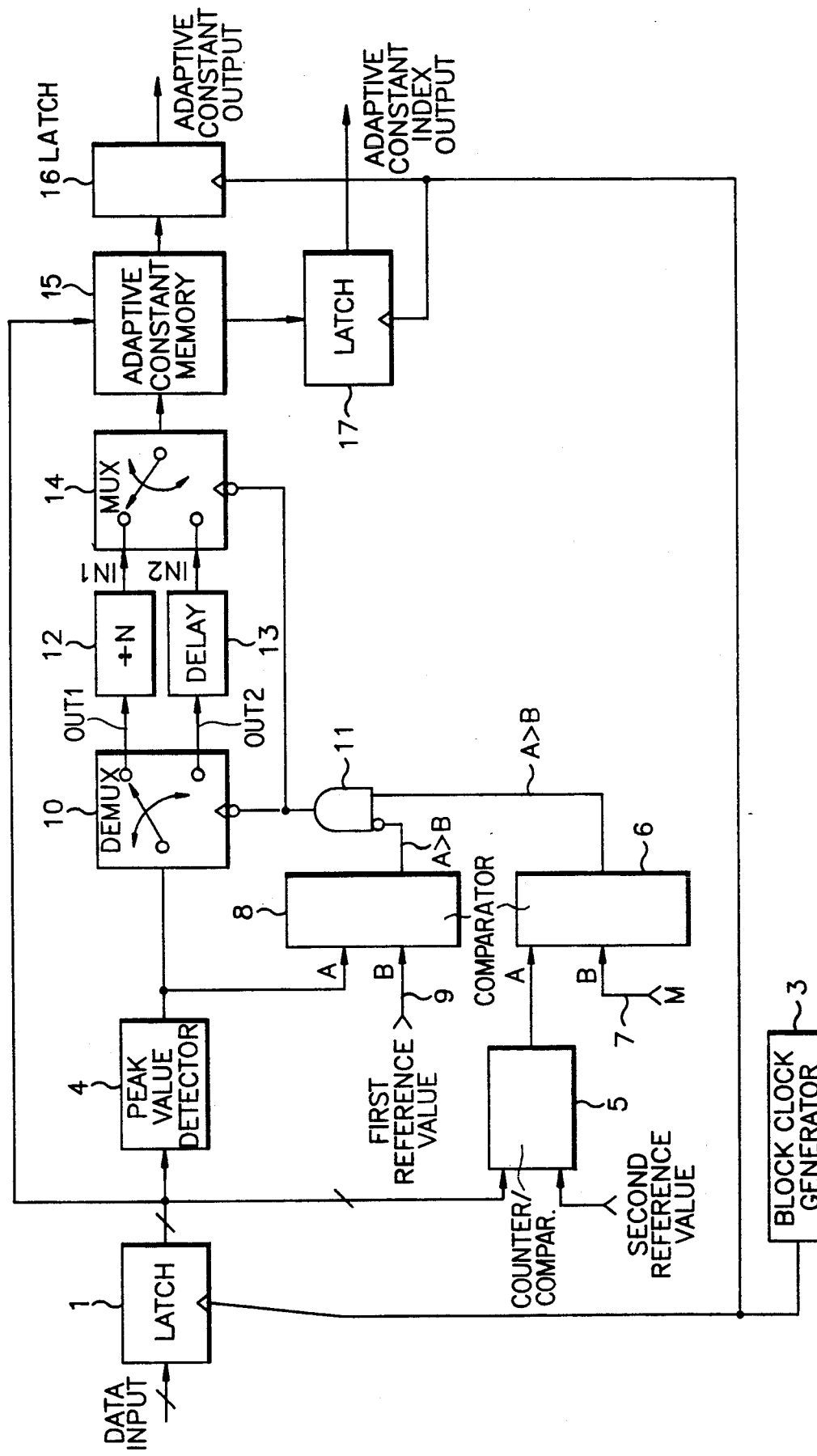
FIG. 3 is a circuit diagram of an adaptive constant generating circuit according to the present invention.

Referring to FIG. 3, input block data is supplied to a latch 1 controlled by a block clock generator 3 and the output of the latch goes to a peak value detecting circuit 4 to detect the maximum value Pb of a video signal. The block clock generator 3 controls the latch 1 (and the further latches 16 and 17) so that the latch allows exactly one block of data to be output therefrom. Moreover, the block data output from the latch 1 is supplied to a counter/comparator circuit 5 to calculate the number Nb of picture elements having a level less than the second reference value in the block and the calculated result is applied to a first comparator 6 to be compared with the given number M. The maximum value Pb detected through the peak value detecting circuit 4 is supplied to a second comparator 8 to be compared with the first reference value.

If the number Nb of picture elements is greater than the number M and the maximum value Pb is greater than the first reference value, a demultiplexer 10 and a multiplexer 14 are connected to an output line OUT1 and an input line IN1, respectively. Hence, the maximum value Pb applied to the demultiplexer 10 is divided by a number N (for example, 2) in a divider 12, and then, supplied to an adaptive constant memory 15. Thus, a larger adaptive constant than an original value is generated. The adaptive constant memory 15 outputs the product of the picture elements and the adaptive constant to latch 16 and outputs an adaptive constant index, indicative of the address in memory 15 where the adaptive constant was read out, to latch 17.

On the other hand, if the number Nb of picture elements is less than the number M or the maximum value Pb is less than the first reference value, the demultiplexer 10 and the multiplexer 14 are respectively connected to an output line OUT2 and an input line IN2. Therefore, the maximum value Pb is supplied to the adaptive constant memory 15 through a delay 13 and the adaptive constant is generated. In this case, three latches 1, 16 and 17 adjust the timing of data under the control of a clock signal generated by the block clock generator 3.

Latch 16 outputs the results of multiplication when the picture elements are multiplied by the adaptive constant read out from adaptive constant memory 15. Latch 17 outputs an adaptive constant index which will be used by the receiver as an address to an adaptive constant memory so that the receiver will be able to read out the same adaptive constant which was used at the transmitter. Thus, the receiver will be able to divide the received picture element signals by the same adaptive constant that was used for multiplication in the transmitter, in order to reproduce the original picture elements.

According to the invention as described above, the picture quality of video signals can be improved. Especially, the picture quality of video signals can be improved when an image block contains edge components therein. This is because an image block including an edge component has picture elements of a relatively high amplitude level as compared to image blocks without any edge components. Thus, an adaptive constant generated for an image block which includes an edge component is relatively low as compared with an adaptive constant generated for an image block which does not include edge components. Therefore, if reproduced in the receiver part, the signal corresponding to the image block with a edge component is apt to be easily influenced or degraded by noise. The invention is thus especially advantageous when image blocks contain edge components.

While the preferred embodiment of the present invention has been particularly shown and described, it will be understood by those skilled in the art that foregoing and other changes in form and details may be made without departing from the spirit and scope of the present invention.

I claim:

1. A method for generating an adaptive constant for adaptive modulation during band compression of video signals, comprising the steps of:

determining if a maximum amplitude value detected from picture elements in a block is greater than a first reference value; and if so then, calculating the number of picture elements in said block having a lower amplitude value than a second reference value; and determining if said calculated number of picture elements is greater than a predetermined number, and if so then, dividing said maximum value by a predetermined constant and generating an adaptive constant corresponding to the divided value from an adaptive constant memory.

2. A method as claimed in claim 1, wherein said first reference value is 64 and 32 when the level of the picture elements relates to low and high frequency bands, respectively.

3. A method as claimed in claim 1, wherein said predetermined number is a 9 in a case of a 4×3 block.

4. A method as claimed in claim 1, wherein said predetermined constant is 2.

5. A circuit for generating an adaptive constant for band compression of video signals, comprising:

first means for detecting a maximum amplitude value of a block of picture elements of digital video signals and comparing said maximum amplitude value with a first reference value;

second means for calculating the number of picture elements having amplitudes less than a second reference value among said block of picture elements and comparing said number of picture elements with a predetermined number, when said first means determines that said maximum amplitude value is greater than said first reference value;

third means for generating a value obtained by dividing said maximum amplitude value by a predetermined constant if it is determined in said second means that the number of picture elements in said block of picture elements is greater than said predetermined number and fourth means for generating an adaptive constant based on an output of said third means.

6. A circuit as claimed in claim 5 wherein said fourth means further includes a circuit for generating an adaptive constant based on an output of said first means when said first means determines that said maximum amplitude value is less than or equal to said first reference value.

7. The method of claim 1 further comprising a step of multiplying each of said picture elements of said block by said adaptive constant.

* * * * *